(12) United States Patent
Powell (10) Patent No.: US 8,061,647 B1
(45) Date of Patent: Nov. 22, 2011

(54) HIGH ALTITUDE TWO BALLOON AIRSHIP

(76) Inventor: John Powell, Folsom, CA (US)

( * ) Notice: Subject to any disclaimer, the term of this patent is extended or adjusted under 35 U.S.C. 154(b) by 692 days.

(21) Appl. No.: 12/082,420

(22) Filed: Apr. 10, 2008

Related U.S. Application Data (60) Provisional application No. 60/923,341, filed on Apr. 13, 2007, provisional application No. 60/965,157, filed on Aug. 17, 2007.

(51) Int. Cl.
  *B64B 1/22* (2006.01)
  *B64B 1/30* (2006.01)
(52) U.S. Cl. .......................... 244/30; 244/127
(58) Field of Classification Search .................. 244/24, 244/25, 27, 30, 31, 125, 127, 128, 5, 32, 244/33
  See application file for complete search history.

(56) References Cited

U.S. PATENT DOCUMENTS

| | | | |
|---|---|---|---|
| 1,005,988 A * | 10/1911 | Maris | 244/5 |
| 1,583,745 A * | 5/1926 | Procopio | 244/5 |
| 3,104,079 A | 9/1963 | Phillips | |
| 3,174,705 A | 3/1965 | Schiff | |
| 4,085,912 A * | 4/1978 | Slater | 244/25 |
| 4,272,042 A * | 6/1981 | Slater | 244/115 |
| 4,470,563 A * | 9/1984 | Engelsman | 244/33 |
| 5,305,970 A | 4/1994 | Porter | |
| 5,518,205 A * | 5/1996 | Wurst et al. | 244/58 |
| 5,810,284 A * | 9/1998 | Hibbs et al. | 244/13 |
| 5,906,335 A * | 5/1999 | Thompson | 244/96 |
| 6,119,983 A | 9/2000 | Provitola | |
| 6,364,252 B1 | 4/2002 | Anderman | |
| 6,471,159 B1 | 10/2002 | Bundo | |
| 6,607,163 B2 * | 8/2003 | Perry et al. | 244/24 |
| 6,609,680 B2 * | 8/2003 | Perry et al. | 244/30 |
| 6,843,448 B2 * | 1/2005 | Parmley | 244/30 |
| 7,108,228 B1 | 9/2006 | Marshall | |
| 7,131,613 B2 | 11/2006 | Kelly | |
| 2005/0258306 A1 | 11/2005 | Barocela | |
| 2005/0269441 A1 | 12/2005 | Barocela | |
| 2007/0029448 A1 * | 2/2007 | Powell | 244/171.3 |
| 2007/0205330 A1 | 9/2007 | Hubbard | |

FOREIGN PATENT DOCUMENTS

| | | | |
|---|---|---|---|
| FR | 2612878 A1 * | 9/1988 | |
| WO | WO 2006/119056 | 11/2006 | |

OTHER PUBLICATIONS

Newman, Dava. Interactive Aerospace Engineering and Design, 1st ed., McGraw-Hill, Jul. 30, 2001. pp. 301-317.*

* cited by examiner

*Primary Examiner* — Tien Dinh
*Assistant Examiner* — Michael Kreiner
(74) *Attorney, Agent, or Firm* — Heisler & Associates (57) ABSTRACT

An airship includes a substantially rigid keel with a balloon suspended from a fore of the keel and a balloon suspended from the aft of the keel. Motor booms extend laterally from the keel between the fore and the aft. Motors with propellers thereon are coupled to the end of each motor boom. The balloons are preferably coupled to the keel through cradles which support portions of the balloon above the keel and restrain the balloons to pivoting motion in a fore and aft pitching direction. A deployment system is disclosed including filing of the balloons within balloon deployment bags on the ground, and then opening the bags at time of launch. The keel and other structural elements can be in the form of a truss, rigid hollow cylindrical tubes, or air beams and stressed skin sheets, or combinations thereof. The airship achieves high altitude controlled flight above the stratosphere.

4 Claims, 5 Drawing Sheets

HIGH ALTITUDE TWO BALLOON AIRSHIP

CROSS-REFERENCE TO RELATED APPLICATIONS

This application claims benefit under Title 35, United States Code §119(e) of U.S. Provisional Application No. 60/923,341 filed on Apr. 13, 2007 and U.S. Provisional Application No. 60/965,157 filed on Aug. 17, 2007.

FIELD OF THE INVENTION

The following invention relates to airships which utilize balloons or other gas envelopes containing a gas that is lighter than air at standard atmospheric temperature and pressure. More particularly, this invention relates to airships for operation in and above the stratosphere.

BACKGROUND OF THE INVENTION

Airships have a long and storied history, even predating that of the airplane. For purposes of this invention, airships are described as any atmospheric vehicles which displace an amount of air at sea level that is greater in mass than a mass of the vehicle, such that lift forces are generated greater than the mass of the vehicle at the surface of the Earth. Furthermore, for purposes of this invention airships are limited to atmospheric vehicles which have at least some degree of steering control such that the vehicle can be navigated through the atmosphere to at least some extent.

Airships have almost exclusively in the past been limited to the lower atmosphere where the higher density of air has allowed such airships to be provided with heavier structures and/or greater payload without excessively large balloons thereon. High altitude balloons are known which travel through the stratosphere and into the mesosphere. However, such balloons at best might have some form of ballast or other altitude control, but without steering control and propulsion for navigation over the surface of the earth, or control merely for station keeping over a single point.

One persistent problem with high altitude balloons is the difficulty in successfully launching them without damaging the large balloons during launch. Even small winds acting upon the large surface area of such balloons, coupled with the relatively lightweight and correspondingly weak structures which can be provided and still maintain high altitude operation are highly susceptible to damage during launch. Not only is the launch phase difficult, but also during ascent various lift and drag forces acting on the balloons can cause the balloons to interact unfavorably with structural portions of the vehicle.

Typically, to solve this problem in the lower atmosphere, balloons or other gas containing envelopes on an airship are contained within an outer envelope. For high altitude performance, the weight associated with such an outer envelope is a luxury that comes with significant weight penalty, thereby making high altitude performance either impossible or the payload provided significantly reduced. Accordingly, a need exists for a high altitude airship which can effectively be launched from the ground, travel safely to high altitude above the stratosphere with a propulsion system able to provide propulsion for steering and navigation of the airship above the stratosphere.

There is a great demand for high altitude airships. They promise to play a critical role in intelligence gathering and telecommunications. This need is exemplified by the Department of Defense of the United States recently turning to the use of free drifting balloons to accomplish goals that could be met by a high altitude airship more effectively, such as gauging wind speeds at various different altitudes for the benefit of operation of remotely piloted drones or other vehicles. The high altitude airship of this invention can provide limited maneuverability, altitude holds, payload infrastructure support and other benefits of the airship while being low cost and easy to deploy and operate.

Prior art attempts at moderately high altitude airships include airships described in U.S. Pat. Nos. 6,609,680 and 6,607,163. Such airships are generally limited to operation in the upper stratosphere, where winds are greater and station keeping less successful. Also, the complexity of such prior art medium high altitude airships have increased their cost and difficulty of launch, leading to less than widespread use.

SUMMARY OF THE INVENTION

With this invention a high altitude airship is provided which can be easily launched, successfully travel through the stratosphere and above the stratosphere to the mesosphere and navigate within the mesosphere. In its preferred form, the airship includes an elongate substantially rigid keel extending from a fore to an aft. Motor booms extend laterally from this keel with motors mounted at ends of these motor booms. Propellers are coupled to these motors and a power supply is also connected to the motors such that these propellers turn to provide propulsion for the airship.

A pair of balloons are coupled to the keel, one adjacent the fore and one adjacent the aft. The balloons are preferably attached to the keel through cradles. The cradles support a portion of the balloon above the keel and allow limited pivoting motion of the balloons relative to the keel. In particular, the cradles preferably limit motion of the balloons to a fore and aft pitching direction by pivoting about a horizontal axis perpendicular to a central axis of the keel.

The high altitude airship is controlled either by utilizing a steering thruster mounted to the keel and with a propeller operating perpendicular to a central axis of the keel, or through differential speed operation of the two propellers, or both. The power supply for the motors is preferably in the form of batteries with the motors being D.C. electric motors suitable for operation with the batteries. The batteries and any payload are mounted to the keel where desired for balancing of the airship. The motors are coupled to an antenna and control signals for the motors can be transmitted from a remote location to the vehicle through the antenna.

The airship is preferably launched by having the balloons initially pivoted away from each other and into a plane generally coplanar with the keel and motor booms. Bags are mounted to the ground surrounding the balloons which contain the balloons while they are being filled with lifting gas. Once the balloons are fully filled with lifting gas, an openable seam on the balloon deployment bags is ripped open to cause the bags to open and the balloons to fly up out of the bags, and then lift the keel and other portions of the airship up. Cradles control balloon motion relative to the keel during ascent to operational altitude (i.e. approximately 100,000 feet). As the airship approaches operational altitude, the propellers can commence operation so that the airship can be navigated. When the mission is complete, the balloons are either released or popped. At least one parachute is preferably contained on the structure which is ejected from the structure and controls descent of the airship back to the ground.

OBJECTS OF THE INVENTION

Accordingly, a primary object of the present invention is to provide an airship which can navigate at high altitudes above the stratosphere.

Another object of the present invention is to provide a high altitude airship which can be easily launched, even in high wind conditions.

Another object of the present invention is to provide a high altitude airship which provides a high altitude platform for successful operation of various missions requiring a high altitude platform.

Another object of the present invention is to provide a high altitude airship which is of low cost, such that the airship can be utilized once or a small number of times and still operate economically.

Another object of the present invention is to provide a high altitude airship which can be piloted either remotely or with an on-board pilot.

Another object of the present invention is to provide a high altitude airship which is scalable in size both to a micro size of exceptionally simple form and a heavy lift size which can carry heavy loads to high altitude stations and perform heavy lifting duties at high altitude air stations.

Another object of the present invention is to provide a high altitude airship that can be easily and reliably launched from the ground and easily and reliably travel through the stratosphere to the mesosphere, and be navigatable within the mesosphere.

Other further objects of the present invention will become apparent from a careful reading of the included drawing figures, the claims and detailed description of the invention.

DESCRIPTION OF THE PREFERRED EMBODIMENT

Figure 1:
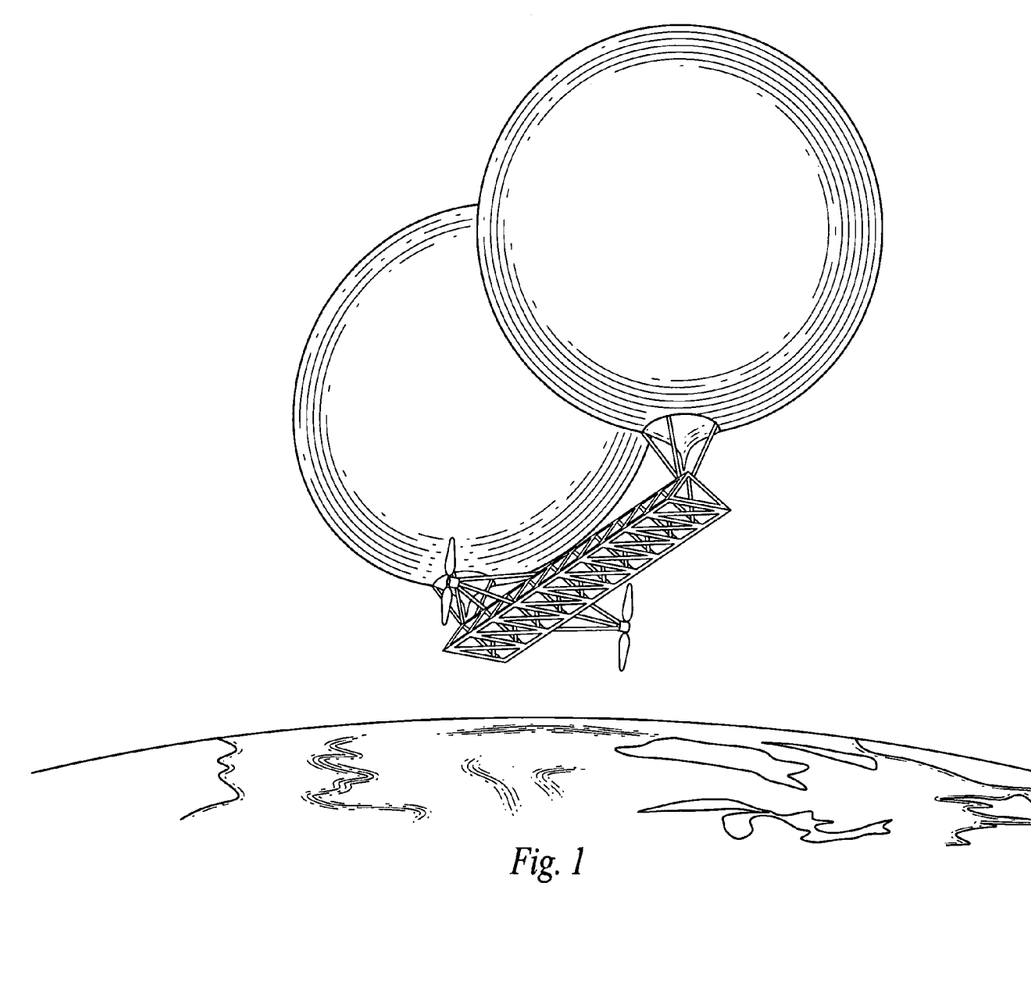
FIG. 1 is a perspective view of the high altitude airship of this invention in flight.

Referring to the drawings, a preferred embodiment of the airship is shown (FIGS. 1-3), a written description of which follows. This description includes details of the structure, lift system, propulsion system, navigation control system, deployment system and recovery system. Two alternative embodiments are also described.

Structure

The airship vehicle is primarily comprised of the rigid vehicle frame also referred to as a keel, for supporting the balloons, the propellers, the power supply and any payload. This structure is most preferably a lightweight carbon fiber truss formed of individual carbon fiber rods. As an alternative, other lightweight materials having sufficient rigidity and structural performance to handle the loads encountered by the vehicle could be substituted. In addition to trusses formed of different materials, the structure could be as simple as a single elongate rod or tube of circular or other cross-section, and either solid or hollow (preferably hollow and formed of carbon fiber for optimal high strength and low weight characteristics).

The structure is elongate in form extending with a largest dimension aligned with a fore and aft direction for vehicle travel. The length of the structure is selected in a preferred embodiment to be approximately equal to half of the maximum girth (diameter in a horizontal plane through a widest portion of the balloon) of the fore balloon plus a maximum girth of the aft balloon (preferably the balloons are of the same size). As the balloons would typically expand with altitude, the length of the structure is preferably similar to the sum of half of the girth of the front balloon and half of the girth of the rear balloon when at maximum altitude. In this way, at the maximum altitude, the front and rear balloons are just touching. If desired, the truss or other structure could have a length slightly greater, such as to prevent or minimize balloon contact, or slightly shorter, such that the balloons largely remain in contact and stabilizing each other.

While the structure is preferably substantially rigid, some amount of flexing of the structure in an elastic manner could be accommodated in certain embodiments. For instance, if the rigidity of the structure was such that flexing of perhaps ten degrees away from an initial centerline could occur on fore and aft portions of the keel without damage to the structure, such limited flexing might be accommodated in the design. If such flexing is expected, overall length of the structure can be modified to account for the slightly shorter overall length resulting from the structure when in flight and loaded in a vertical upward direction at ends of the structure and in a downward direction uniformly over the structure based on the weight of the structure itself and at point loads associated with the weight of motors, propulsion systems, payloads and any other equipment mounted to the vehicle.

The structure also includes lateral booms which extend laterally from an elongate centerline of the keel of the structure. These lateral booms, providing a preferred form of motor boom, are preferably in the form of additions to the carbon fiber truss that are themselves trusses of hollow carbon fiber tubing extending generally perpendicular to the centerline of the keel and a common distance in opposite directions away from the centerline. Ends of the lateral booms have motor mounts for propeller motors at ends thereof spaced from the keel. These lateral booms are preferably similar in length to half of a diameter of each propeller, with additional length to provide a clearance distance, so that the propellers can rotate freely, without contact with any portions of the structure.

The motor booms could alternatively be formed in a manner other than with a truss-like structure. For instance, in a simplest form of the invention elongate rods, such as hollow carbon fiber rods could merely extend laterally away from the elongate centerline of the structure to provide the lateral arms.

The fore and aft tips of the keel preferably are provided with strengthened mounting locations where balloon cradles are rotatably mounted to the structure. The balloon cradles, also called balloon cups, have a generally funnel-like form with a small diameter end adapted to receive a fill port of the balloon adjacent thereto and with a large diameter portion of each balloon cradle having an annular form for supporting a portion of the balloon adjacent thereto; both while the balloon is smaller diameter at lift off (i.e. twenty feet in diameter) and large diameter at peak altitude (i.e. sixty-two feet in diameter).

The larger diameter portion of each cradle is also referred to as a ring. The ring is rigidly connected to the small diameter portion, such as through four linear arms. The ring is preferably a portion of a torus in geometric form so that it presents a smooth curving surface abutting portions of the balloon. The curving portion faces generally upward and opposite a small diameter portion of the cradle.

The balloon cradles are adapted to keep the larger diameter portion thereof generally adjacent the surfaces of the balloons at all times. The balloon cradles are limited to rotation in a fore and aft (pitch) direction. In particular, pivoting axes for each of the balloon cradles extend horizontally and perpendicular to a long axis of the keel of the structure (when the long axis of the keel extends within a horizontal plane). Rotation of the balloon cradles relative to the structure is most preferably restricted to a certain amount of degrees of rotation so that the balloons are prevented from rotating into undesirable positions relative to the structure (for instance 90° of rotation from horizontal to vertical).

Optimization of the rotational position of each balloon cradle relative to the structure can be determined through experimentation. Generally, it is desirable to keep the balloons away from the structure and particularly the propellers. Furthermore, stresses between the balloons and the balloon cradles can be minimized by restricting rotation of the balloon cradles as little as possible so that the balloons seek an equilibrium position depending on the conditions in existence during the flight. By allowing the balloon cradles to pivot to accommodate this equilibrium position while maintaining a large diameter portion of each balloon cradle generally in contact with surfaces of the balloon at all times, loads on the balloons are minimized. Most preferably, interior surfaces of the balloon cradles are coated or draped with a low friction fabric or other material (i.e. nylon) so that surface contact between the balloon and the balloon cradle does not cause any wear or point loads to the balloon surface.

While the balloon cradles are preferably provided to allow for controlled pivoting, as an alternative, the balloons could merely be tethered to or near ends of the structure at fore and aft locations.

The structure also typically includes some form of payload support. This could be within a truss forming the keel or could be on separate payload/instrumentation bays or platforms extending below the keel or lateral to the keel centerline or above the keel. In largest forms of the airship, the payload could include a crew compartment, which would typically be a lightweight pressurized enclosure. As an alternative, crew could wear a pressure suit.

Lift System

Figure 2:
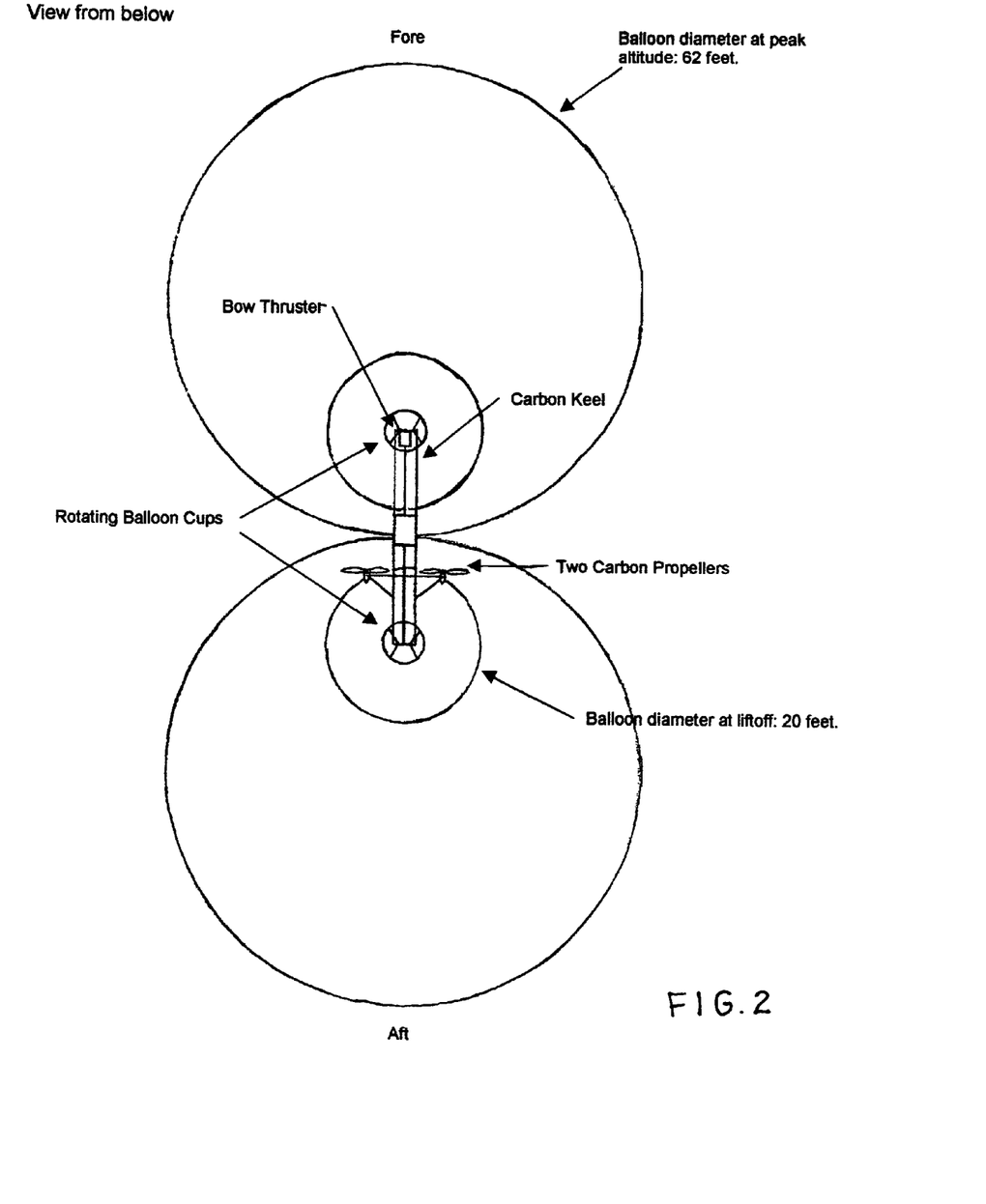
FIG. 2 is a bottom plan view of the airship showing a diameter of the balloons at low altitude superimposed over the diameter of the balloons at peak altitude.

The lift system for the vehicle preferably includes two balloons mounted adjacent fore and aft ends of the structure. These balloons are preferably standard latex weather balloons having a skin layer formed of elastomeric material and inflated to design specifications before launch. In this particular embodiment balloons are used that exhibit a diameter of twenty feet at sea level and sixty-two feet at an operational altitude of approximately 100,000 feet. FIG. 2 is drawn approximately to scale with a keel length of twenty-eight feet. As shown, balloons press against each other and the cradles allow the balloons to extend up from the keel and away from the other balloon somewhat.

Other alternatives for the lift system include substantially inelastic skin balloons (also called zero pressure balloons), or more than two balloons. If more than two balloons are provided, preferably they are aligned in a fore and aft direction along a centerline of the structure, to minimize drag when the airship is under propulsion.

Propulsion System

The propulsion system for the vehicle is preferably a pair of motors with associated propellers. The motors are preferably located at tips of the lateral booms most distant from the centerline of the structure, and with the propellers facing either forward or backward (preferably forward), and with a rotational axis for each propeller parallel with and spaced from the fore to aft centerline of the keel of the vehicle.

The propellers are optimized for high altitude use, such as propellers utilized on the Helios prototype aircraft built by AeroVironment, Inc. of Monrovia, Calif. in cooperation with NASA's Dryden Flight Research Center. The Helios technology is further described in U.S. Pat. No. 5,810,284, incorporated herein by reference.

Motors similar to those disclosed in the Helios prototype could also be utilized. Specifically, the motors are preferably D.C. electric motors having an output shaft speed and torque performance to drive the propellers at optimized speed. At altitude (i.e. 100,000 feet), the two propellers provide a velocity of approximately five knots.

A power supply provides electric power to the motors which is preferably in the form of a sufficient number of lithium ion batteries or other relatively light weight batteries to provide the flight duration desired. The batteries are preferably mounted to the structure near a centerline of the structure and where desired for balancing of the airship.

While batteries are preferably utilized as the power source for the vehicle, it is conceivable that solar panels could be mounted to the structure or suspended below the structure in positions on the structure where at least occasional incident sunlight would strike the solar panels to provide electric power for the motors. Another alternative for the power source would be fuel cells.

Navigation and Control System

Preferably, a flight controller is provided to control propeller speed and to also control a steering thruster, such as a bow thruster. In particular, the propellers are preferably powered at a common speed, but could be powered at different speeds to provide keel yaw control. The propellers could be increased or decreased in rotational velocity together to increase or decrease forward speed of the vehicle (or even potentially reverse). The bow thruster is preferably mounted at or near a fore end of the structure. The bow thruster preferably includes a propeller mounted to a pivoting support and motor which is also coupled to the battery or other electric power source. The bow thruster can thus be controlled in rotational speed as well as direction so that the bow thruster can steer the vehicle effectively to cause the vehicle to experience yaw adjustment.

As an alternative to the bow thruster, yaw control for the vehicle could be provided by differential thrust through differential rotational speeds of the two propellers. In which case, the bow thruster might be eliminated or augmented.

Control information could be provided from an autopilot computer, such as to follow a preprogrammed flight path or to travel following a specified heading. Such a control system would typically also require some instrumentation including a compass, a wind speed and airspeed indicator, and/or a GPS (Global Positioning System) instrument. As an alternative, or in addition, the airship can be controlled from a pilot on the ground or another remote location. The motors and any bow thruster would receive control signals transmitted from the pilot to the airship and received by an antenna on the airship. While the payload of the preferred embodiment is about twenty pounds, in larger embodiments the vehicle could be crewed and the control information could come from a pilot.

Deployment System

Figure 3:
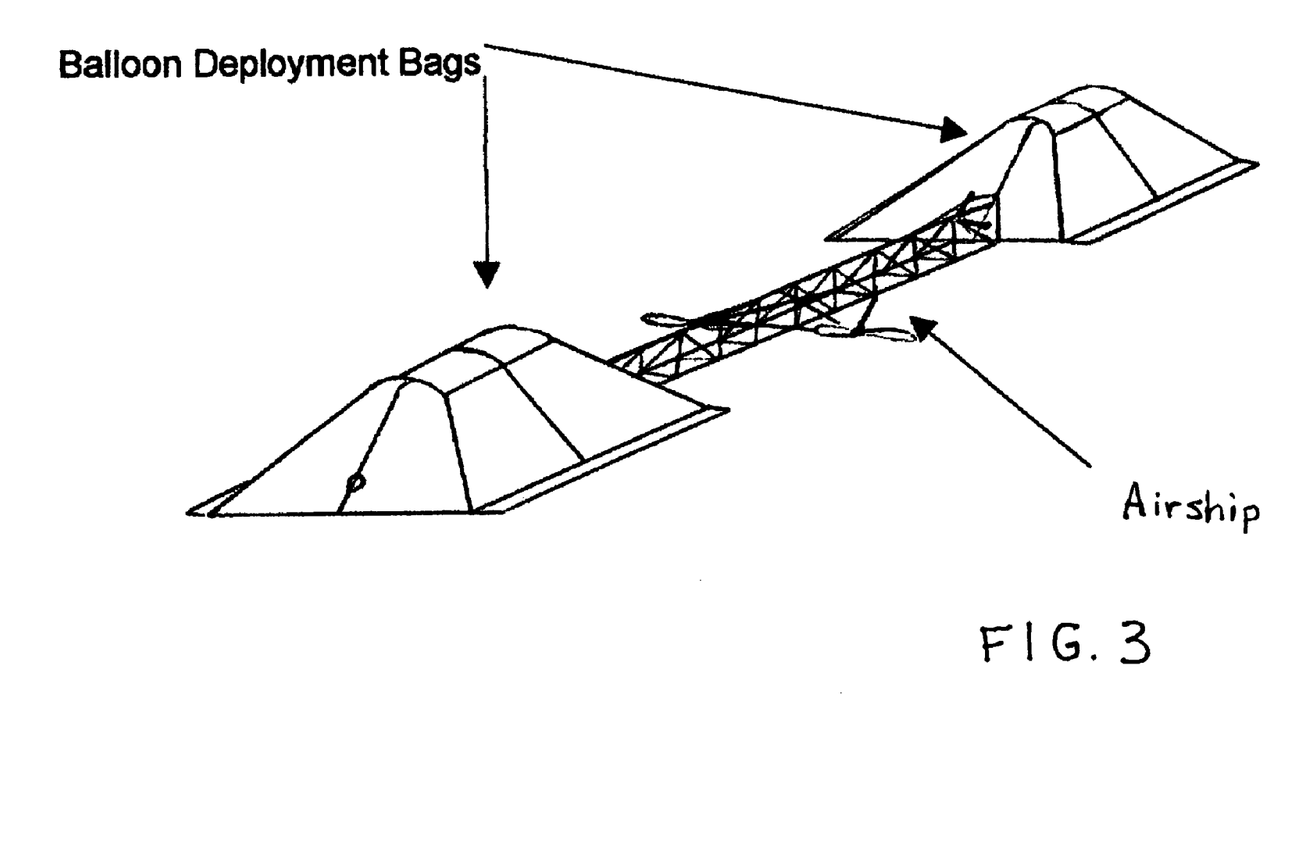
FIG. 3 is a perspective view of the airship while the balloons are being filled within balloon deployment bags and before launch.

With particular reference to FIG. 3, details of a preferred system for deploying the airship is described. The airship is similar to that shown in FIGS. 1 and 2 and is shown in FIG. 3 lying flat on the ground between two balloon deployment bags. Each balloon deployment bag includes a floor portion and a cover portion which are sewn together about a perimeter. The floor portion is of smooth material and is not strictly required but helps to prevent a balloon therein from being damaged by contact with any sharp items on the ground.

The cover of each balloon deployment bag has an openable seam thereon. Initially while the balloons are being filled with lifting gas this openable seam is closed. This openable seam can be in the form of a strip of material which is velcroed on either side to large flaps of the cover. A line can be coupled to one end of this strip and then this line can be pulled to peel the strip away from the flaps to open a large opening in the cover of the balloon deployment bag. When the balloons are completely filled with lifting gas and the airship is ready for launch, two individuals would run away from each other peeling open the balloon deployment bags and releasing the balloons.

The balloons lift up and carry the airship off of the ground as the balloon then travels from the surface up to the high altitude operational environment. The balloon cradles can preferably pivot at least 90° to a horizontal orientation for filling of the balloons. Once the airship is at operational altitude, the cradles will have pivoted to a substantially vertical position with the balloons either near each other or actually in contact with each other.

The balloon deployment bags are connected to the ground about a perimeter, such as with tent stakes or other anchors to ensure that the balloons do not prematurely launch along with the balloon deployment bags. All interior surfaces of the balloon deployment bags are of smooth fabric material to prevent damage to the balloon. Also, preferably the upper cover portions of the balloon deployment bags include a plurality of pockets thereon which can receive weights in a distributed pattern to keep the flaps weighted down and to keep the balloon close to the ground, and to avoid excessive movement of the flaps especially when high wind conditions are present. With utilization of the balloon deployment bags, the airship can be launched in relatively high wind, even winds up to forty knots.

Recovery System

After a mission is complete or power for the engines is exhausted, the airship is returned to the ground in the following manner. Initially, upon determination that the mission should be terminated the balloons are released. If one of the balloons has popped (typically terminating the mission due to the popping of the balloon) the remaining balloon is typically released. If neither of the balloons have popped but the time for the mission has terminated, the balloons are both released substantially simultaneously. The structure of the balloon including the keel and the motor booms then begin their rapid descent under force of gravity back towards the Earth.

A parachute is included, attached to this structure. The parachute can be automatically deployed due to the velocity of the structure in a downward direction, such as by packing the parachute within a vented compartment such that air passing up through the vented compartment pushes the parachute out and deploys the parachute. Most preferably, however, the parachute is coupled to a parachute cannon which utilizes a spring, charge of compressed gas, or some other force applying means to blast the parachute out away from other portions of the vehicle to cause the parachute to be deployed upon receiving a signal from the controller for deployment of the parachute.

At least one parachute is provided sufficiently large to decelerate the vehicle so that upon contact with the ground either no damage occurs or damage is limited to small portions of the structure which can be relatively easily repaired. For larger vehicles larger parachutes or multiple parachutes can be utilized.

Often at least some of the instrumentation on the airship includes video such that ground controllers can observe function of the airship as if the ground controller were on the airship. One use of such video is to note the position of the propeller blades. By viewing the position of the propellers, additional power can be provided to the propellers until the propellers have stopped in a horizontal orientation. By having the propellers oriented horizontally during descent, impact with the ground is less likely to damage the propellers.

Micro Tandem Embodiment

In one embodiment of the airship of this invention (FIG. 4), referred to by the trademark MICRO TANDEM an embodiment of the airship is described which minimizes a size, weight and complexity of the airship, while still maintaining high altitude navigational performance. A sketch of one embodiment of the Micro Tandem airship is included herein. This drawing shows latex weather balloons A suspended above a keel B. The keel B is merely an elongate rigid tube, preferably of carbon fiber or other very lightweight rigid material. The balloons A are merely suspended above the ends of the keel, rather than utilizing balloon cradles in this embodiment. Typically small balloons A can also be utilized due to the lesser overall weight of the airship.

Figure 4:
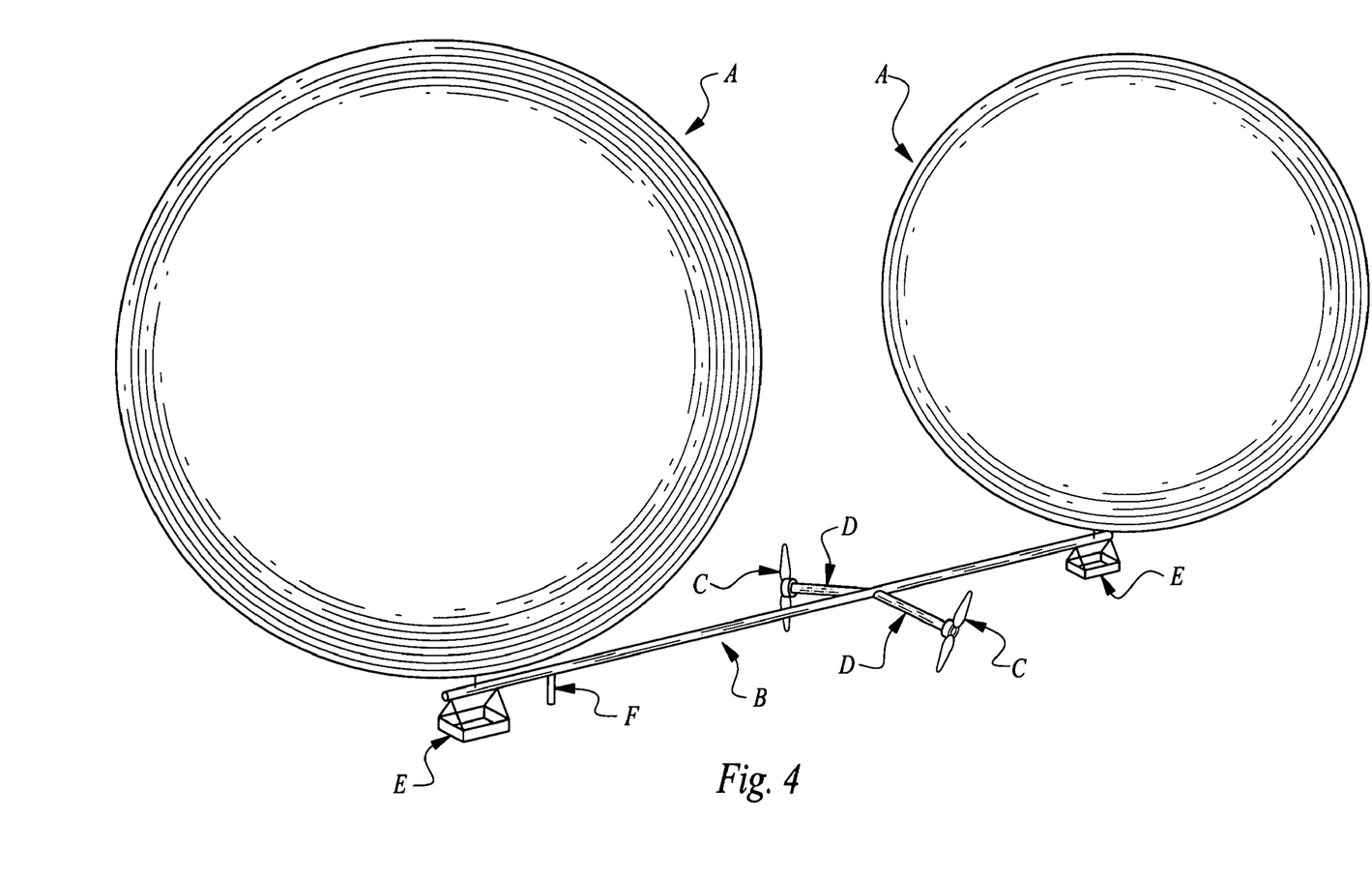
FIG. 4 is a perspective view of an alternative embodiment of the invention utilizing hollow cylindrical tubes for structural members and without cradles for attachment of balloons to the structure.

Electric motors with propellers C are mounted at ends of motor booms D that extend laterally from the keel B generally near a midpoint of keel B. The motor booms D are also formed of rigid tubes, preferably made of carbon fiber. These motor booms D are shown angling downward slightly. In this way, the airship has four points on the ground before launch for added stability.

With the Micro Tandem airship of this embodiment, instrument bays E are provided below each end of the keel B. These bays E can include batteries and other portions of a control system for the electric motors C, as well as any payload. Power and signal transmission occurs along a cable harness running along a length of the keel B to the motor booms D and next to the motors C. Other experiments or other payloads could also be provided upon these instrument bays E. The instrument bays E also provide bases to support the keel B above the ground before launch. An antenna F preferably extends down from the keel B near one of the instrument bays E and provides for communication with ground controllers for piloting of the airship and/or for communication with any payloads or other instrumentation upon the airship.

Heavy Lift Tandem Disclosure

Figure 5:
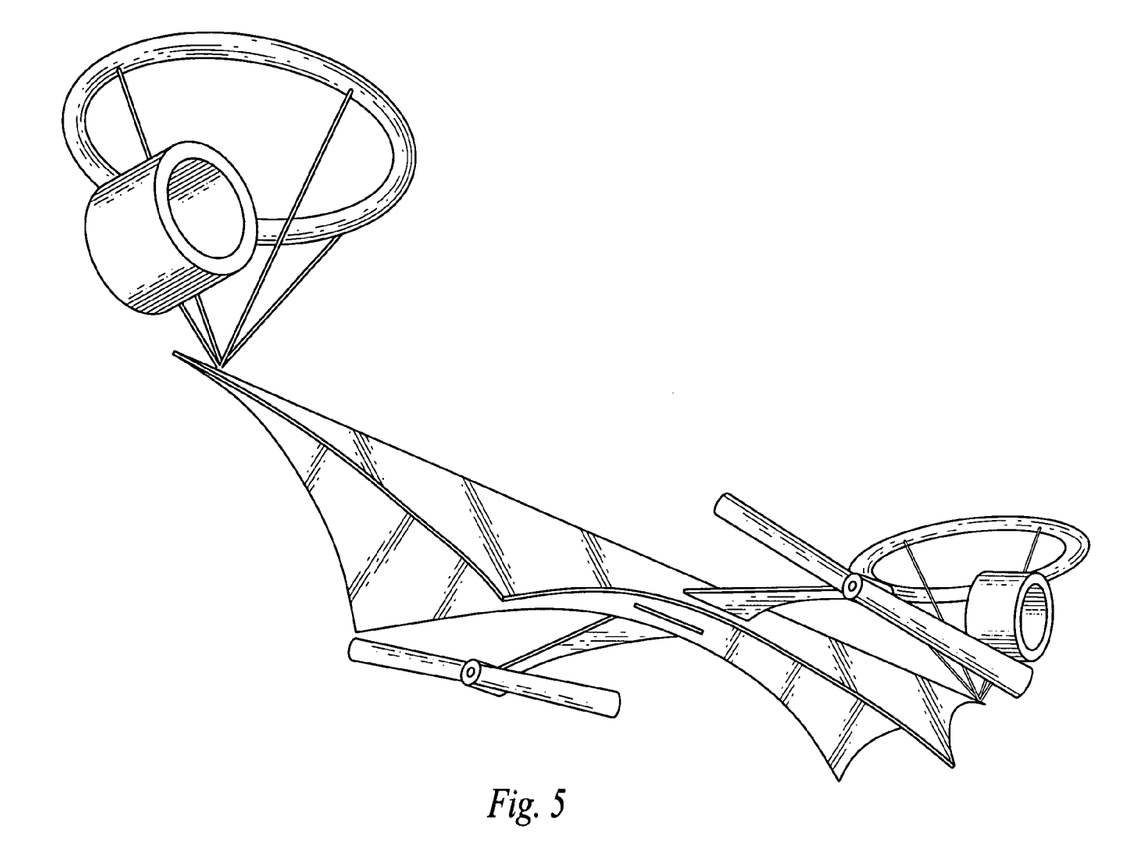
FIG. 5 is a perspective view of a further alternative embodiment utilizing air beams and stressed skin and with reels for zero pressure balloons.

With particular reference to FIG. 5, a further embodiment of the airship of this invention is a heavy lift high altitude airship. The heavy lift airship is scaled up to a larger size such that heavy loads can be lifted. To further accommodate lifting of such heavy loads, the heavy lift tandem preferably utilizes polyethylene balloons or other zero pressure balloons formed of a skin which is flexible but substantially inelastic. These polyethylene or other zero pressure balloons are preferably mounted upon reels to the keel. Optionally, the reels are mounted through a pivoting cradle structure as described in the preferred embodiment above. As an alternative, the reel could function without a cradle and be rigidly mounted to the keel.

The reels can have a large portion of a polyethylene balloon mounted thereon by rolling of the spool to pull portions of the balloon thereon. In this way, the zero pressure balloon can be more easily handled on the ground even though its volume is only partially filled before the low pressure environment at high operating altitude is reached. The balloons are played off of the spool as the airship rises to maintain control of the gas filled portion of the balloon at all portions of the flight.

Furthermore, to accommodate these large polyethylene balloons, the keel is most preferably approximately 200 feet long so that the heavy lift airship can handle loads of up to five tons and carry them up to 140,000 feet. One destination for such an airship would be a high altitude floating station, such as a dark sky station available from JP Aerospace of Rancho Cordova, Calif. and described in Published Patent Application No. 2007/0029448, incorporated herein by reference in its entirety. To provide the keel with requisite stiffness and maintain its lightweight character, the keel is preferably formed at least partially of air beams in the form of flexible elastic air containing tubes contained within a nylon sleeve or other lightweight sleeve of substantially inelastic but flexible material. When the inner tube is filled and pressurized (with air or other gas), it presses against the outer sleeve, causing the outer sleeve to go taut and to make the overall tube structure rigid. Further structural strength can be provided by having a planar skin under tension extending from the separate air beams. Details of such structures are described in U.S. patent application Ser. No. 12/069,231, incorporated herein by reference in its entirety.

By strategic positioning of the geometry of the air beams and stressed skin sheets, a rigid and very lightweight structure is achieved. As shown in the figures, the air beams follow a perimeter of the keel with the skin fabric stretched as a web from a central spine to the perimeter. The central spine could be an air boom or a carbon fiber (or other material) truss or tube. Points are provided below a centerline of the keel which act as feet to cause the heavy lift tandem to rest above ground both during takeoff and landing for clearance of the propellers. Furthermore, these feet can act as mounting points for the carrying of cargo. Also, elongate cargo can be straddled by the heavy lift airship between the legs and still be clear of the propellers. The heavy lift tandem most preferably includes cradles similar to those described above. These cradles help to restrict the balloons to locations away from the propellers and away from excessive movement which might cause damage to the balloons or contact with portions of the airship or cargo carried by the airship which might cause damage to the balloons. While two larger propellers are shown for the heavy lift airship, a larger number of propellers could be provided to augment thrust.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A high altitude airship, comprising in combination:
  a substantially rigid keel having an elongate form between a fore and an aft;
  a pair of motor booms extending laterally from said keel and attached to said keel, said motor booms extending away from said keel on opposite sides of a centerline of said keel;
  a motor coupled to each motor boom on a portion of each said motor boom spaced from said keel;
  a propeller coupled to each said motor;
  at least two balloons, one of said balloons attached to said keel closer to said fore and one of said balloons coupled in fixed position to said keel closer to said aft;
  said balloons filled with a gas that is lighter than air at standard temperature and pressure, such that said balloons exert an upward force on the airship;
  said balloons each having a balloon surface with an inner side adjacent said gas with which said balloon is filled and an outer side opposite said inner side, said outer side adjacent atmosphere surrounding the airship and through which the airship is adapted to travel; and
  wherein each of said balloons is coupled to said keel through a cradle, said cradle adapted to pivot relative to said keel.

2. The airship of claim 1 wherein said motors are coupled to a controller supplying electric power to the motors and controlling a speed with which the motors rotate the propellers, the controller adapted to cause the motors to turn the propellers at different speeds to cause yaw motion of said keel.

3. The airship of claim 1 wherein said balloons are coupled to said keel at said fore and at said aft, said keel having a length between said fore and said aft similar to half of a combined diameter of said two balloons when fully expanded at high altitude.

4. The airship of claim 1 wherein said motors are coupled to a controller, said controller coupled to an antenna, said antenna adapted to receive a control signal from a remote location with the controller able to interpret the control signal to cause a pilot at a remote location to control navigation of the airship.

* * * * *